United States Patent
Kötting et al.

[15] 3,665,659
[45] May 30, 1972

[54] METHOD FOR THE PRODUCTION OF THE CIRCUMFERENCE OF A SPECTACLE LENS

[72] Inventors: Fritz Kötting, Sturzelberg; Gotteried Gas, Monheim, both of Germany

[73] Assignee: Firma Wernicke & Co., Dusseldorf-Eller, Jagerstr., Germany

[22] Filed: Oct. 1, 1969

[21] Appl. No.: 862,868

[52] U.S. Cl...............................................51/323, 51/284
[51] Int. Cl.................................................B24b 1/02
[58] Field of Search..................51/323, 284; 29/413; 225/2, 225/96.5

[56] References Cited

UNITED STATES PATENTS 2,352,616   7/1944   Canning..........................51/284 X
3,286,893   11/1966  Zellers............................225/96.5

Primary Examiner—Lester M. Swingle
Attorney—James M. Heilman and Heilman & Heilman

[57] ABSTRACT

The invention relates to a method for the production of the circumference of a spectacle lens with cutting off the edge of the blank and grinding according to a template or a glass lens mount in order to obtain the final lens form. The subject of the invention is also an apparatus for carrying out this method.

4 Claims, 6 Drawing Figures

Patented May 30, 1972

INVENTORS
FRITZ KOTTING
GOTTFRIED GAS

By James M. Heilman
ATTORNEY

Patented May 30, 1972
3,665,659
2 Sheets-Sheet 2
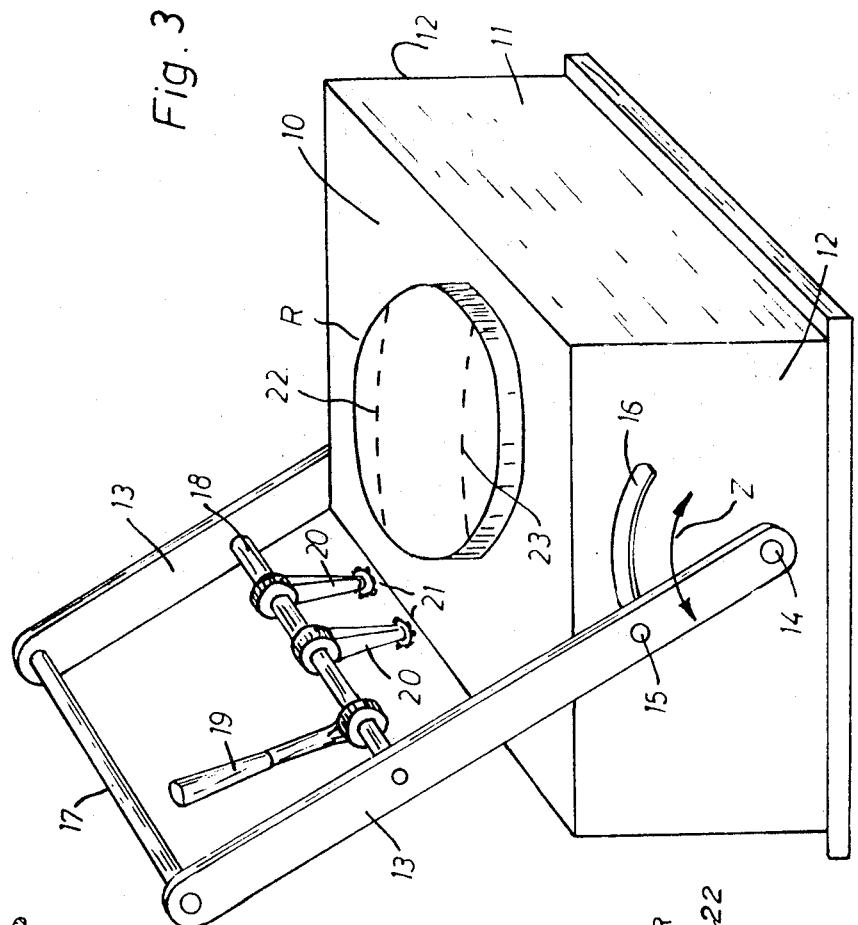
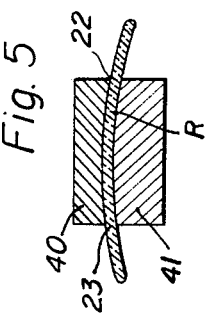
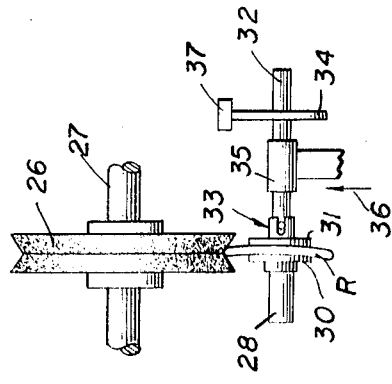
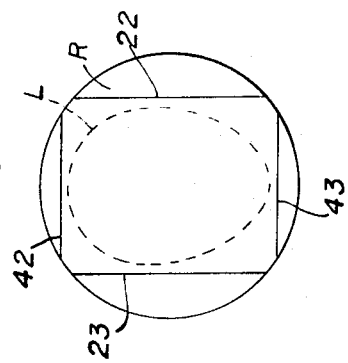
INVENTORS
FRITZ KOTTING
GOTTFRIED GAS
By James M. Heilman
ATTORNEY

METHOD FOR THE PRODUCTION OF THE CIRCUMFERENCE OF A SPECTACLE LENS

The invention relates to a method for the production of the circumference of a spectacle lens with cutting off the edge of the blank and grinding according to a template or a glass lens mount in order to obtain the final lens form. The subject of the invention is also an apparatus for carrying out this method.

Modern spectacle lens forms show a more or less great deviation from the round blank form. While in correction lenses the circumference of the lens must have a certain position with respect to the geometric and optical center of the lens, this requirement is practically eliminated in industrial, sporting, and sun glasses. The method according to the invention is not limited, however, to these types of glasses, but can also be used in the same or slightly modified form for correction glasses if the position of the optical and geometric center of the lens is taken into consideration.

Particularly in industrial, sporting, and sun glasses it is necessary to grind a considerable portion of the lens edge, since the form deviates from the circular form of the blank. This represents not only a considerable time consumption of the grinding machines, but it also results to a great extent in wear of the grinding means, that is, the grinding disks.

It is known that the desired spectacle lens may be cut from a round blank if necessary by taking into account an overmeasure. This requires a complicated machine which ensures curve cutting and rotation of the blank. Besides, the cutting operation itself requires considerable time since the cutting must be effected by scratching or scoring by means of the cutting tool from the top side of the lens with repeated rotation of the lens.

The object of the invention is to provide a method of the above mentioned type which permits a cheaper and faster production, particularly of industrial-and sporting- and sun glasses, where the time consumption of the grinding machines and the wear of the grinding disks is reduced. The success of the method manifests itself in the fact that inexpensive lenses can be produced without the high grinding costs and still with a form deviating from the circular blank form, which are not only stylish but also ensure special protection of the eye, for example, in industrial- or sun glasses by lateral covering of the eye.

In order to achieve this objective, the invention provides that sections are separated or pre-scored and broken off from the round blank by two parallel straight cuts extending between the circumference of the blank and the circumference of the finished lens and that the edge portions still protruding over the circumference of the finished lens are then ground off in known manner. While heretofore the blank material between the round initial circumference and the circumference of the finished lens was removed by curve-cutting and grinding, the approximate form of the final lens can now be produced in a short time, by two parallel cuts and the final form of the lens can be produced by brief grinding.

Preferably the two straight cuts are made parallel to the longest extension or perpendicularly to the shortest axis of the finished lens.

The method is suitable both for round finished lenses and for unround finished lenses. For round finished lenses two pairs of parallel cuts are made in a right angle to each other, while for the production of unround finished lenses the above mentioned two linear parallel cuts are made parallel to the longest axis of the lens surface or perpendicularly to the shortest axis of the lens surface.

The apparatus for carrying out the method provides a support for one or several blanks, above which are arranged one or two devices which perform a linear cut or two parallel linear cuts in the proximity of the lens edge. Preferably the cutting devices are variable in their mutual distance when two parallel cuts are made. Likewise the cutting depth of the cutting devices is also variable.

In a preferred embodiment of the apparatus for mass production cutting devices performing one or two linear parallel cuts in the direction of motion are arranged on a conveyor belt to support the lenses. The belt can carry cams, supporting knobs or similar devices against which the blank bears or by which the blank is held on the belt.

In another embodiment of the apparatus which serves substantially for the individual treatment of lenses according to the method of the invention, one or several cutting devices for the linear cut(s) are pivotally mounted above the support for the blank. The circular pivotal path of the cutting device corresponds to the curvature of the blank or approximately to the curvature of the blank.

Embodiments of apparatus for carrying out the method according to the invention are represented in the attached drawing.

FIG. 3 is an apparatus which is suitable primarily for the individual production.

FIG. 4 is a plan view of the main components of an edge grinding machine.

FIG. 5 is a cross-sectional view of a support means for holding the lens blank for breaking off the unwanted sections.

FIG. 6 is a plan view of a lens blank having a double pair of cuts disposed at right angles for eliminating four sections.

Figure 1:
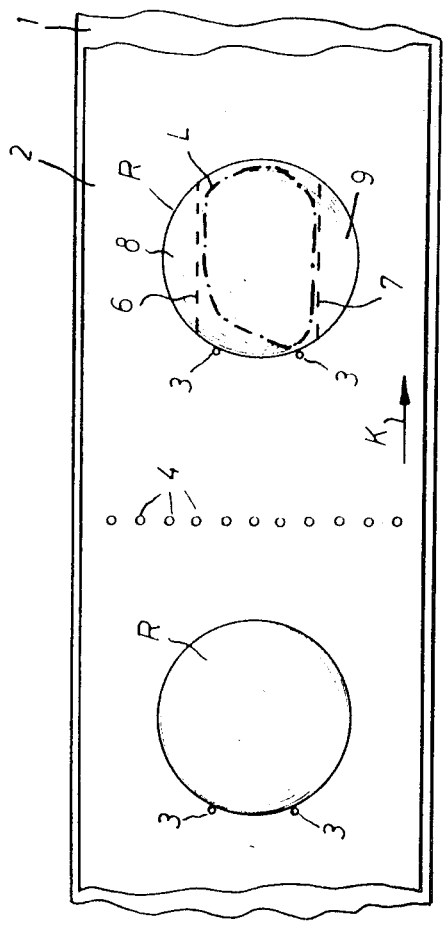
FIG. 1 shows a top view of the lens blanks on a conveyor belt.
Figure 2:
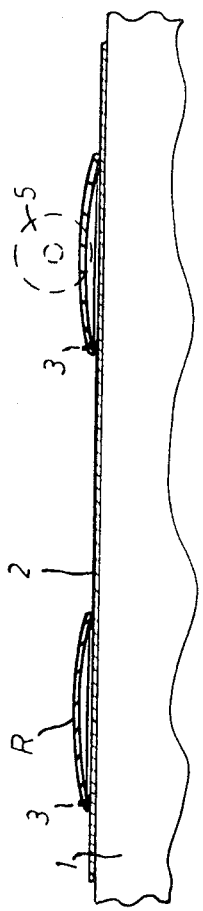
FIG. 2 is a section through an apparatus for the mass production of lenses.

In the embodiment according to FIG. 1 and 2, an endless belt 2, which can extend over driven guide rollers or cylinders (not represented) slides over a stationary support 1 in the form of a frame, etc. On the belt are arranged a series of cams 3 in transverse direction side by side and spaced from each other for engaging the lens blanks R.

The belt 2 can also be provided with holes 4 arranged in transverse direction, through which the rivet-type pins or cams protrude with their shafts in such a way that they form a support for the blank R. Corresponding to the size of the blank and the position of the cuts to be described below, the rivet-type pins can be inserted in a different distance into the holes 4.

Above the belt 2 are arranged two cutting devices 5 which produce two parallel cuts 6, 7 in the lens which are arranged parallel to the direction of motion K of the belt 2. The distance of the two cutting devices 5 from each other is variable so that the distance of the cuts 6, 7 can also be varied. In FIG. 1 the final form is indicated by the broken line L. The distance of the cuts 6, 7 as well as their position depends on the form and the longitudinal extension of the finished glass.

The cutting devices 5 can be so arranged that they produce a substantially complete cut or only a preliminary separation. The sections 8, 9 to be removed from the center part of the blank can then be easily broken off.

After making the cut or cuts, which extend symmetrically to the cams 3 or the pins, the cut blank slides off the belt and can drop into a waterbath or into a suitable catching device. The blank is removed therefrom and, if necessary, the sections, 8, 9 are broken off, which does not represent a time-consuming operation. Since only a small blank section is left for grinding, it can be removed by grinding according to a templet or a glass mount.

In the embodiment according to FIG. 3 the blank R is placed on a stationary support 10, for example, a box 10 and the support can carry markings for the position of the blank R. At the two side walls 12 of the box are mounted for rotation about journals 14 two arms 13, the rotary movement being limited by a journal 15 and the end walls of a curved slot 16. Between the two pivot arms 13 extends a bar 17 by means of which the two pivot arms 13 can be turned about the journals 14. A shaft 18 is provided between the two arms 13, which carries a lever 19 and two extensions 20 whose distance from each other on shaft 18 is variable. At the lower end of the extensions is arranged a cutting device 21, which produce two parallel cuts 22, 23 in the blank R when the arms 13 are moved in the direction of the double arrow Z. The cutting tools are pressed by means of the hand lever 19 when the latter is turned.

In FIG. 4 there is illustrated an edging machine which can be used to grind away the excess glass material to produce a lens having the desired shape. This machine is known as a bevel edger and includes a grinding wheel 26 formed with a V-shaped groove in its periphery and adapted to grind a V-shaped bevel on the edge of a lens blank R. Wheel 26 is mounted on a shaft 27 and is connected to a power means for turning it. The lens blank R is secured to shaft 28 by two washers 30 and 31 but the shaft and lens blank are free to move toward or away from the grinding wheel 26 and to move a lesser amount along the axis of shaft 28. The lens blank is turned slowly by shaft 32 which coupled to shaft 28 by a pin and slot combination 33. Secured to shaft 32 is a templet 34 made to have a periphery of the same shape as the desired lens shape. Shaft 32 is journaled in a bearing 35 which is resiliently stressed to move in the direction of arrow 36 toward the grinding wheel 26. A contact shoe 37, secured to the base, acts as a limit stop for the templet and prevents further grinding after the lens blank has been ground down to size.

In FIG. 5 the lens blank R is shown secured between two jaws 40 and 41 made so as to have their sides adjacent to the score marks 22 and 23. After mounting, a sharp tap by a hammer on each of the sections will break the sections away.

In FIG. 6 the usual score marks 22 and 23 are shown parallel to the longest diameter of the desired shape L of the lens. In this figure two additional score marks 42 and 43 have been made at right angles to score marks 22 and 23. The extra sections may be removed in the same manner as described above.

What is claimed is:

1. A method for the production of spectacle lenses having non-circular peripheries by cutting off the edges of the blanks and grinding the blanks to a desired shaped circumference using a templet to produce a final lens shape; characterized by the steps of scoring the lens surface by two straight parallel cuts external of said circumference to form edge sections and the remaining edge portions while the blanks are successively drawn under a pair of scoring tools, breaking off the edge sections of the blank lying outside the area formed by the two cuts, and grinding off the remaining edge portions protruding over the circumference of said final lens shape.

2. A method according to claim 1, characterized by making parallel cuts by said scoring tools in a direction which is parallel to an axis of the final lens having the longest length.

3. A method according to claim 1, characterized by making two pairs of parallel cuts by said scoring tools, said pairs disposed perpendicular to each other.

4. A method according to claim 1 characterized by moving the lens blanks in sequence under a scoring means by means of a resilient belt.

* * * * *